(12) United States Patent
Sar

(10) Patent No.: US 6,353,220 B1
(45) Date of Patent: Mar. 5, 2002

(54) SHIELDING OF LIGHT TRANSMITTER/ RECEIVER AGAINST HIGH-POWER RADIO-FREQUENCY RADIATION

(75) Inventor: David R. Sar, Corona, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/495,612

(22) Filed: Feb. 1, 2000

(51) Int. Cl.[7] ............................................. H01J 40/14
(52) U.S. Cl. ...................................... 250/239; 359/152
(58) Field of Search ......................... 250/239; 359/152, 359/153, 154, 161, 173

(56) References Cited

U.S. PATENT DOCUMENTS 5,572,348 A * 11/1996 Carlson et al. ............. 359/125

* cited by examiner

Primary Examiner—Stephone Allen

(57) ABSTRACT

A light transmitter/receiver is shielded against high-power radio-frequency radiation by a window having a first light-transparent plate, a second light-transparent plate disposed substantially parallel to and spaced apart from the first light-transparent plate, a frame receiving the first light-transparent plate and the second light-transparent plate therein, and a liquid filling the space between the first light-transparent plate and the second light-transparent plate. The liquid includes water. The window is positioned between the light transmitter/receiver and a source of radio-frequency radiation with the first light-transparent plate facing the source. The radio-frequency radiation has a frequency exceeding about 0.9 GHz and a power exceeding about 1 milliwatt per square centimeter measured at the first light-transparent plate.

16 Claims, 3 Drawing Sheets

SHIELDING OF LIGHT TRANSMITTER/RECEIVER AGAINST HIGH-POWER RADIO-FREQUENCY RADIATION

This invention was made with government support under contract number F29601-98-9-0001 awarded by the Department of the Air Force. The government has certain rights in this invention.

BACKGROUND OF THE INVENTION

This invention relates to systems wherein a light transmitter/receiver operates in an environment including high-power radio-frequency radiation.

Light transmitter/receivers include light transmitters such as lasers and light receivers such as light-sensitive cameras and sensors. Light transmitter/receivers must sometimes operate in an environment that includes radiation at frequencies of about 0.9 GHz (gigahertz) and higher, and with the radiation at power levels exceeding about 1 milliwatt per square centimeter. Such a radiation environment is terned "high-power radio-frequency radiation" herein. An example is a light-receiver camera that is positioned to observe wave soldering processes conducted within an industrial microwave oven. Another example is a light-transmitter laser that provides spot-heating in the same industrial microwave oven.

The high-power radio-frequency radiation may disrupt the operation of the light transmitter/receiver by interfering with its electronic processes. In some circumstances the high-power radio-frequency radiation may damage or even destroy the light transmitter/receiver. It is therefore necessary to shield and protect the light transmitter/receiver from the high-power radio-frequency radiation, but without substantially interfering with the operation of the light transmitter/receiver.

Windows are known that are transparent to light but reduce or prevent the penetration of radio-frequency radiation. Such windows may be placed between the environment of radio-frequency radiation and the light transmitter/receiver to shield and protect the light transmitter/receiver. Two basic types of windows are known. In one, a light-transparent window substrate has a grid of metallic lines extending over its transverse extent. The grid prevents intrusion of the radio-frequency radiation, while permitting passage of a portion of the incident light. The grid has the shortcoming that it casts a shadow, either onto the surface of a light receiver or into the beam of a light transmitter. The grid may itself be damaged by the incident light energy of a powerful light transmitter such as a laser. The other type of window has a coating of an electrically conductive material on the light-transparent window substrate. The coating inhibits the penetration of radio-frequency radiation through the window. Examples of known coatings include tin oxide and indium-tin-oxide. The coating casts no shadow, but it has the shortcoming that it is effective in blocking radio-frequency radiation of only relatively low power levels, such as up to about 0.1 milliwatt per square centimeter, far below the regime of the high-power radio-frequency radiation.

At the present time, those who use light transmitter/receivers in the environment of high-power radio-frequency radiation must accept the presence of shadows cast by metallic grids. In some applications, however, such shadows are unacceptable. There is a need for an improved approach to the shielding and protection of light transmitter/receivers that must operate in an environment of high-power radio-frequency radiation. The present invention fulfills this need, and further provides related advantages.

SUMMARY OF THE INVENTION

This invention provides a method and structure for shielding a light transmitter/receiver against high-power radio-frequency radiation. The structure is in the form of a window, through which light is transmitted from or to the light transmitter/receiver. The approach of the invention may be used where the radio-frequency radiation is of high power, and is not limited by the use of coatings such as tin oxide and indium-tin-oxide. No shadow is produced in the beam of the light transmitter/receiver. The window may be easily and inexpensively constructed.

In accordance with the invention, a light transmitter/receiver is shielded against high-power radio-frequency radiation having a frequency exceeding about 0.9 GHz (gigahertz) and a power exceeding about 1 milliwatt per square centimeter. The method includes providing a light transmitter/receiver, and providing a window. The window comprises a first light-transparent plate, and a second light-transparent plate spaced apart from the first light-transparent plate. The two light-transparent plates are desirably, but not necessarily, parallel. Their surfaces may be coated with anti-reflective coatings. A liquid fills the space between the first light-transparent plate and the second light-transparent plate. The liquid comprises water, preferably pure water, but aqueous solutions such as salt brines may also be used. A frame may be provided to support the first and second light-transparent plates, and to seal against leakage of the liquid. The window is positioned between the light transmitter/receiver and a source of radio-frequency radiation with the first light-transparent plate facing the source. Preferably, either the source of the high-power radio-frequency radiation or the light transmitter/receiver is placed into a housing, with the window being through a wall of the housing.

The light transmitter/receiver may be a light source-transmitter such as a laser, or a light receiver such as an electronic light sensor. The first light-transparent plate and the second light-transparent plate may be any light-transparent material, such as glass or plexiglass. Preferably, the two light-transparent plates have high transmittance and low attenuation at the wavelength(s) of the light, and are no thicker than necessary to contain the liquid. The liquid within the space between the two light-transparent plates may be stationary, or it may be flowed through the space.

The approach of the invention uses a water-filled window to protect the light transmitter/receiver from external high-power radio frequency radiation. The window is easily and inexpensively constructed, and has no noxious constituents. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
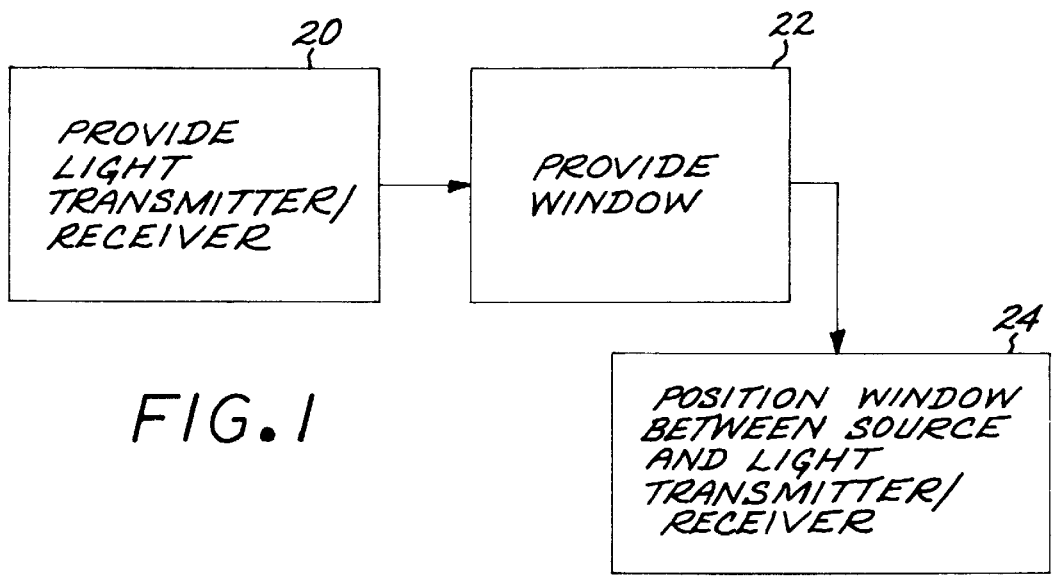
FIG. 1 is a block flow diagram of an approach for practicing the invention.
Figure 2:
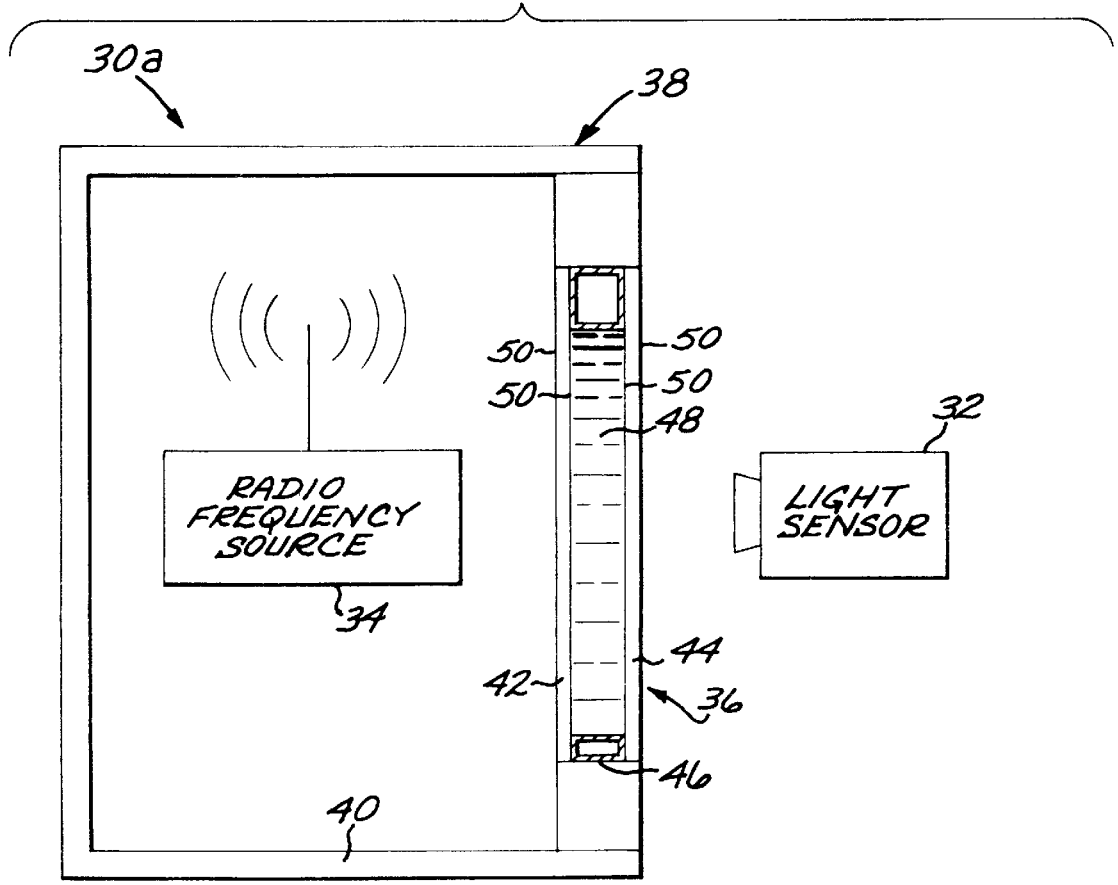
FIG. 2 is a schematic side sectional view of a first embodiment of a shielded light transmitter/receiver system in accordance with the invention.
Figure 3:
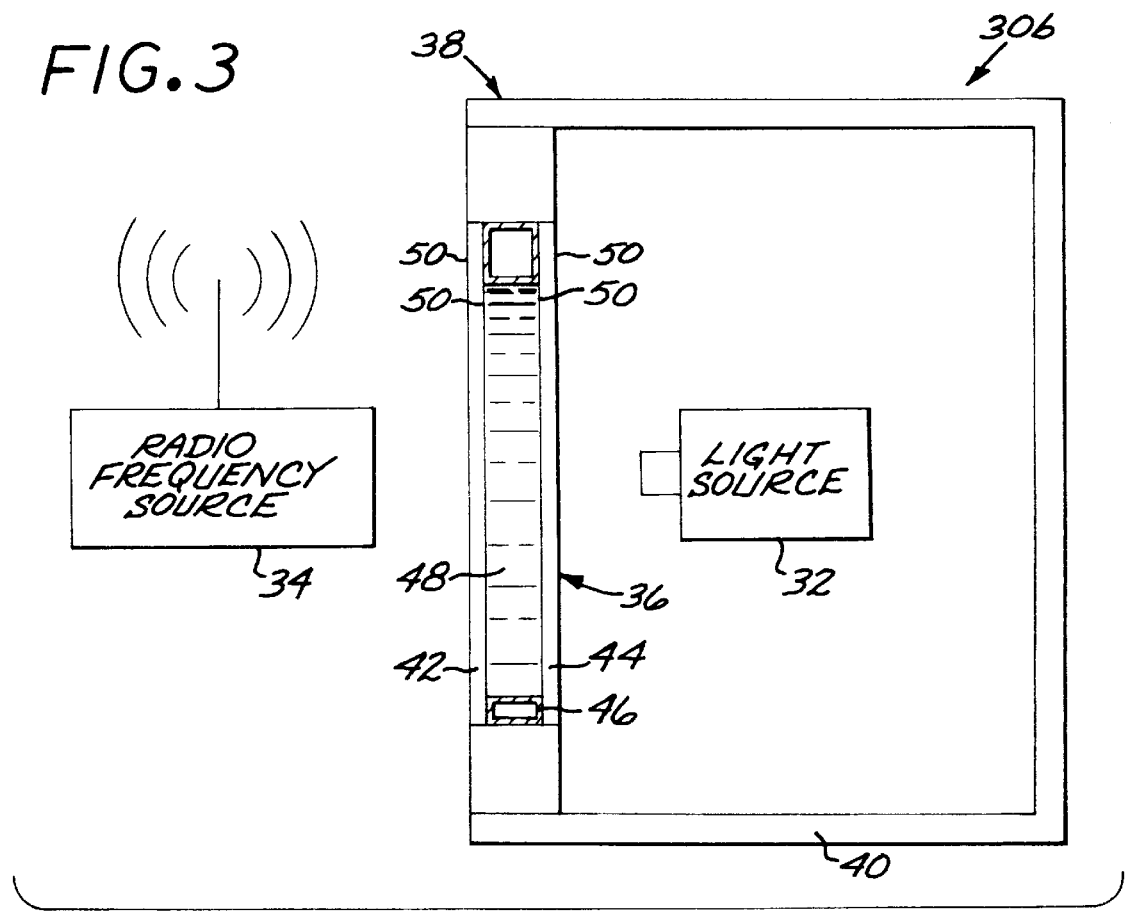
FIG. 3 is a schematic side sectional view of a second embodiment of a shielded light transmitter/receiver system in accordance with the invention.

FIG. 1 illustrates a method for practicing the invention, and FIGS. 2–3 illustrate two preferred systems 30a and 30b in which the invention is practiced. The embodiments of FIGS. 2–3 are similar except as will be discussed herein, the same reference numerals are used in each case where appropriate, and the same discussion is applicable in each case where appropriate. Referring to FIG. 1, a light transmitter/receiver 32 is provided, numeral 20. In the embodiment of FIG. 2, the light transmitter/receiver 32 is a light sensor such as an electronic light sensor, examples being a television camera or a focal plane array. In the embodiment of FIG. 3, the light transmitter/receiver 32 is a light source such as a laser. Both light receivers and light transmitters fall within the scope of the term "light transmitter/receiver" and are within the scope of the present invention. The light transmitter/receiver preferably operates in the visible portion, the near-ultraviolet portion, or the near-infrared portion of the spectrum, over a wavelength range of from about 100 to about 1800 nanometers.

A high-power radio frequency source 34 is present. The high-power radio frequency source 34, which is illustrated schematically and generally, is of any operable type, and may be present intentionally or unintentionally. The radio frequency source emits radiation having a frequency exceeding about 0.9 GHz (gigahertz) and a power exceeding about 1 milliwatt per square centimeter measured at the nearest face of the window (to be discussed subsequently) to the radio-frequency source 34. Such radiation is termed "high-power radio-frequency radiation" herein, and is distinct from radiation at lower frequencies and lower power levels. The high-power radio-frequency radiation is distinct from that at lower frequencies, because the shielding technique discussed herein is only effective in this frequency range above about 0.9 GHz (as will be demonstrated in relation to FIG. 6). The high-power radio-frequency radiation is distinct from that at lower power, because lower-power radio frequency radiation is readily shielded by coatings such as tin oxide and indium-tin-oxide.

A window 36 is provided, numeral 22, and positioned between the light transmitter/receiver 32 and the high-power radio frequency source 34, numeral 24. A housing 38 with a wall 40 is placed around the high-power radio frequency source 34, with the window 36 through the wall 40 of the housing 38 and the light transmitter/receiver 32 outside the housing 38, as shown in FIG. 2; equivalently for the present purposes, the housing 38 is placed around the light transmitter/receiver 32 with the window 36 through the wall 40 of the housing 38 and the radio frequency source 34 outside the housing 38, as shown in FIG. 3. In each case, the combination of the wall 40 of the housing 38 and the window 36 shield and protect the light transmitter/receiver 32 from the high-power radio frequency radiation emitted by the source 34. The window 36 allows the passage of light through the wall 40 of the housing 38, while maintaining the radio frequency shielding.

Figure 4:
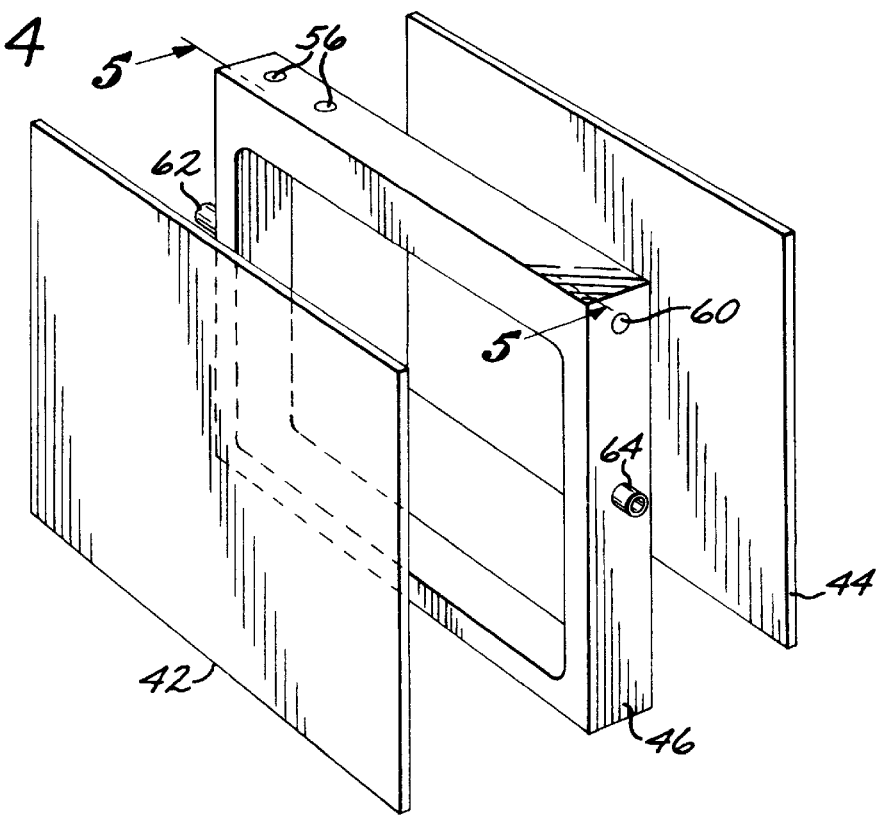
FIG. 4 is a schematic perspective exploded view of the window used in the systems of FIGS. 2 and 3, but without the water present.

The assembled structure of the window 36 is shown in detail in FIGS. 2–3, and FIG. 4 is an exploded view. The window 36 includes a first light-transparent plate 42 and a second light-transparent plate 44. The two light-transparent plates 42 and 44 are each made of a material that is transparent to light in the frequency range of interest. In the preferred case of light in the visible range, the light transparent plates 42 and 44 are preferably each made of glass, quartz, or plexiglass, but any operable material may be used. The two light-transparent plates 42 and 44 are spaced apart from each other, preferably but not necessarily in a facing and parallel relationship.

The two light-transparent plates 42 and 44 are supported in a frame 46 to hold them in the desired relationship to each other, and to any other related structure such as the housing 38. Typically, the two light-transparent plates 42 and 44 are sealed to the frame 46 with a gasket such as an O-ring seal or a bead of a sealant, and the frame 46 is sealed to the related structure such as the housing 38 by a similar approach. The seals are water tight.

A space between the two light-transparent plates 42 and 44, and within the boundary defined by the frame 46, if present, is filled with a liquid 48. The liquid comprises water. The water may be relatively pure, such as distilled or de-ionized water, conventionally available water, such as tap water, or a solution of water and another substance, such as a salt which forms a brine solution. Tests have shown that the window 36 performs approximately the same for each of these liquids 48.

The light-transparent plates 42 and 44 may optionally be provided with anti-reflective coatings 50 on their surfaces. The anti-reflective coatings 50 are of conventional types known in the art, that are optimized according to the materials on each side of the surfaces. For the surfaces between the plate 42 or 44 and air, an air/plate material (e.g., glass, quartz, plexiglass) anti-reflective coating is used. For the surfaces between the plate 42 or 44 and water, a plate material/water anti-reflective coating is used.

When the window 36 is in service, the first light-transparent plate 42 faces the radio frequency source 34, as illustrated in FIGS. 2–3. The power level of the radio-frequency source 34 is measured at the exterior surface of the first light-transparent plate 42 before the radio frequency energy enters into the material of the first light-transparent plate 42.

Figure 5:
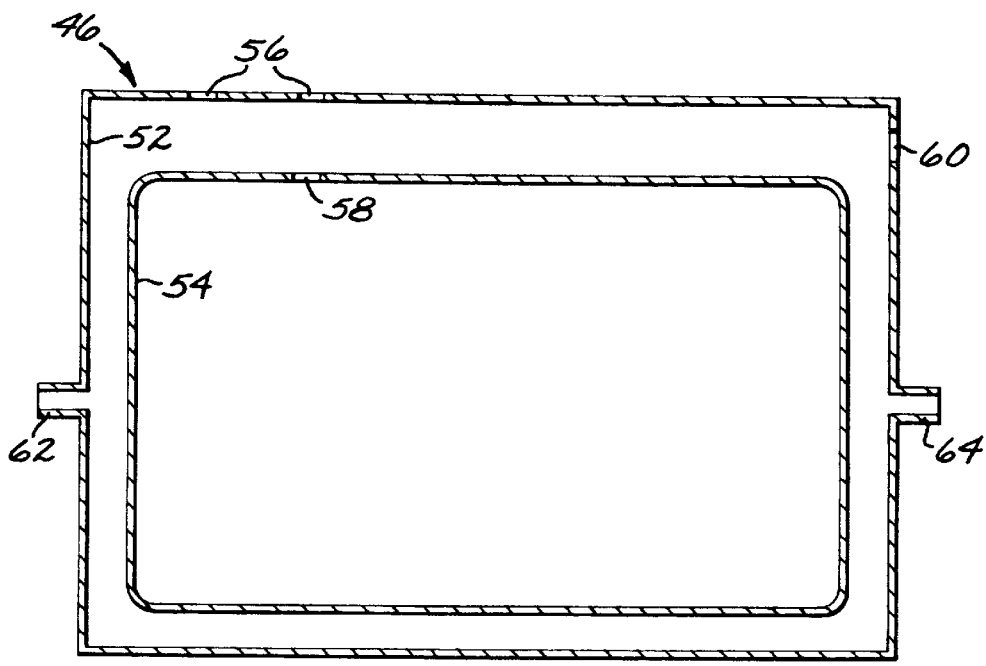
FIG. 5 is a schematic sectional view through the frame of the window of FIG. 4, taken on line 5—5.

FIG. 5 illustrates the preferred structure of the frame 46 in greater detail. The frame 46 includes an outer wall 52 and an inner wall 54. Fill holes 56 are provided in a top side of the outer wall 52 to add liquid to the frame 46, with a corresponding hole 58 communicating into the interior of the inner wall 54. The volume within the inner wall 54 may change slightly as the temperature changes, and the inner wall 54 acts as a thermal expansion compensating piston. Any excess water is expelled through a hole 60. Optionally, a liquid flow inlet 62 and a liquid flow outlet 64 are provided on opposite sides of the outer wall 52. The inlet 62 and outlet 64 allow the liquid 48 to be flowed through the interior of the frame 46 to cool the window 36 in the event that the high-power radio frequency source 34 heats the window 36 by a significant amount and a flow of coolant is required.

In service, the window 36 is mounted to the housing 38, and the system is assembled as illustrated for the preferred embodiments in FIGS. 2–3. The window 36 is filled with water or other operable liquid. The radio frequency source 34 is operated, and the light transmitter/receiver 32 is operated. The window 36 allows light to pass into and/or out of the light transmitter/receiver 32, while shielding and protecting the light transmitter/receiver 32 from interference and/or damage by the high-power radio frequency energy produced by the source 34.

Figure 6:
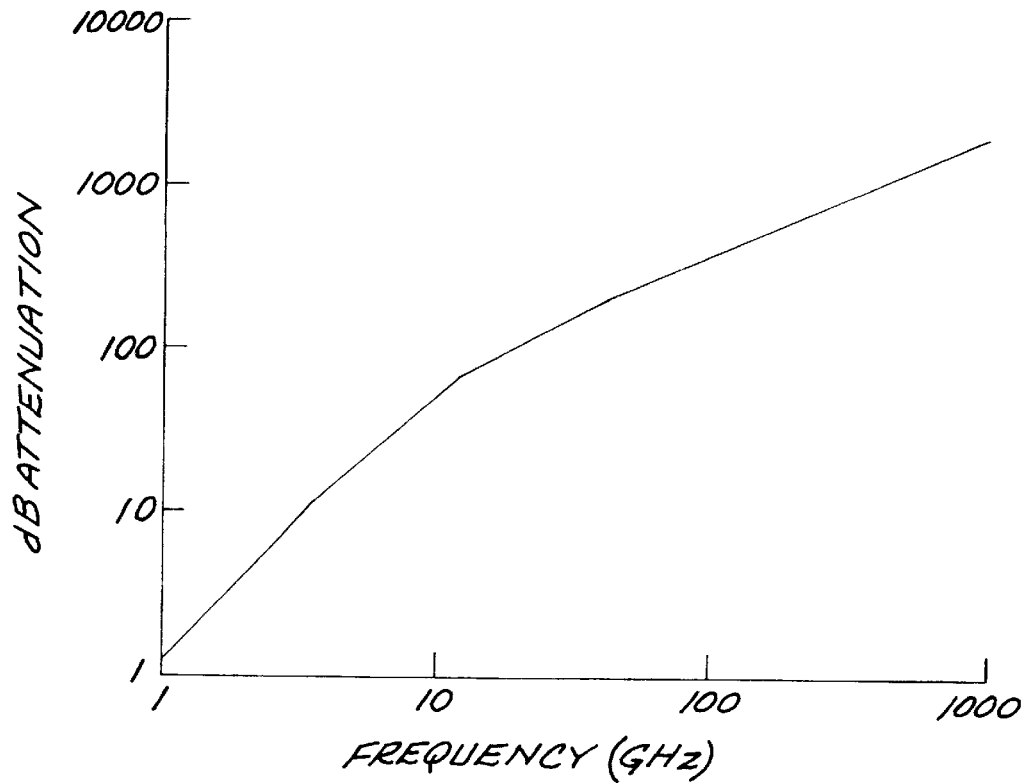
FIG. 6 is a graph of radio frequency power attenuation for 1 centimeter of water, as a function of frequency of the radio frequency signal.

FIG. 6 illustrates the attenuation in dB of radio frequency radiation by 1 centimeter of water in a window 36. That is, the inner surfaces of the plates 42 and 44 are spaced apart by 1 centimeter. Below about 0.9 GHz, there is substantially no attenuation. The attenuation steadily increases with increasing frequency, achieving substantial attenuation in the mid-microwave range of about 20–100 GHz.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for shielding a light transmitter/receiver against high-power radio-frequency radiation, comprising the steps of:
   providing a light transmitter/receiver;
   providing a window, comprising
      a first light-transparent plate,
      a second light-transparent plate spaced apart from the first light-transparent plate, and
      a liquid filling the space between the first light-transparent plate and the second light-transparent plate, the liquid comprising water; and
   positioning the window between the light transmitter/receiver and a source of radio-frequency radiation with the first light-transparent plate facing the source, the radio-frequency radiation having a frequency exceeding about 0.9 GHz and a power exceeding about 1 milliwatt per square centimeter measured at the first light-transparent plate.

2. The method of claim 1, wherein at least one of the source of radio-frequency radiation and the light transmitter/receiver is positioned in a housing, and the window extends through a wall of the housing.

3. The method of claim 1, wherein the light transmitter/receiver is a light sensor.

4. The method of claim 1, wherein the light transmitter/receiver is an electronic light sensor.

5. The method of claim 1, wherein the light transmitter/receiver is a light source.

6. The method of claim 1, wherein the first light-transparent plate is glass.

7. The method of claim 1, wherein at least one surface of at least one of the transparent plates is coated with an anti-reflective coating.

8. The method of claim 1, wherein the first light-transparent plate is plexiglass.

9. The method of claim 1, wherein the light transmitter/receiver is a laser.

10. The method of claim 1, wherein the liquid is water.

11. The method of claim 1, wherein the liquid is salt brine.

12. The method of claim 1, including an additional step of
   flowing the liquid through the space between the first light-transparent plate and the second light-transparent plate.

13. A method for shielding a light transmitter/receiver against high-power radio-frequency radiation, comprising the steps of:
   providing a light transmitter/receiver;
   providing a window, comprising
      a first light-transparent plate,
      a second light-transparent plate disposed substantially parallel to and spaced apart from the first light-transparent plate,
      a frame receiving the first light-transparent plate and the second light-transparent plate therein, and
      a liquid filling the space between the first light-transparent plate and the second light-transparent plate, the liquid comprising water; and
   positioning the window between the light transmitter/receiver and a source of radio-frequency radiation with the first light-transparent plate facing the source, the radio-frequency radiation having a frequency exceeding about 0.9 GHz and a power exceeding about 1 milliwatt per square centimeter measured at the first light-transparent plate.

14. The method of claim 13, wherein at least one of the source of radio-frequency radiation and the light transmitter/receiver is positioned in a housing having a wall, and the window extends through the housing.

15. The method of claim 13, wherein the window further includes a fill-hole through the frame.

16. The method of claim 13, wherein the window further includes
   a liquid flow inlet through the frame, and
   a liquid flow outlet through the frame.

* * * * *